(12) United States Patent
Suryanarayanan et al.

(10) Patent No.: US 7,797,483 B1
(45) Date of Patent: Sep. 14, 2010

(54) WRITE INTERCEPTOR FOR TRACKING CHANGES TO DISK IMAGE

(75) Inventors: Rangarajan Suryanarayanan, Santa Clara, CA (US); Yogita Bijani, Santa Clara, CA (US); Pashupati Kumar, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 393 days.

(21) Appl. No.: 10/875,494

(22) Filed: Jun. 23, 2004

(51) Int. Cl.
*G06F 12/00* (2006.01)
*G06F 13/00* (2006.01)
(52) U.S. Cl. .............. 711/112; 711/100; 711/111; 711/154; 711/162
(58) Field of Classification Search ............. 711/100, 711/111, 112, 154, 162
See application file for complete search history.

(56) References Cited

U.S. PATENT DOCUMENTS

| | | | |
|---|---|---|---|
| 5,835,953 A * | 11/1998 | Ohran | 711/162 |
| 6,035,412 A * | 3/2000 | Tamer et al. | 714/6 |
| 6,112,277 A * | 8/2000 | Bui et al. | 711/114 |
| 6,615,277 B1 * | 9/2003 | Curtis | 719/310 |
| 6,684,229 B1 * | 1/2004 | Luong et al. | 711/162 |
| 7,103,740 B1 * | 9/2006 | Colgrove et al. | 711/162 |
| 2003/0200290 A1 * | 10/2003 | Zimmerman et al. | 709/222 |
| 2004/0268026 A1 * | 12/2004 | Royer et al. | 711/104 |
| 2005/0010835 A1 * | 1/2005 | Childs et al. | 714/6 |
| 2006/0010316 A1 * | 1/2006 | Burokas et al. | 713/2 |

FOREIGN PATENT DOCUMENTS

CA 2092119 A * 9/1994

* cited by examiner

*Primary Examiner*—Tuan V. Thai
(74) *Attorney, Agent, or Firm*—Van Pelt, Yi & James LLP

(57) ABSTRACT

According to some embodiments, a technique for tracking changes to a disk image is disclosed. The technique comprises tracking a change request associated with a disk block; allowing the change request to pass to a disk driver; and associating the change request with an operating system's persistent storage.

21 Claims, 7 Drawing Sheets

WRITE INTERCEPTOR FOR TRACKING CHANGES TO DISK IMAGE

FIELD OF THE INVENTION

The present invention relates generally to computer systems, more specifically, it relates to techniques for backing up computer systems.

BACKGROUND OF THE INVENTION

Data protection plays an increasingly important role in today's computer systems. Data protection often involves creating regular backups of data. Data may be backed up in various ways, such as a full backup or a differential backup. A full backup typically backs up an entire disk, while differential backups typically backup blocks that have been changed since the previous full backup. It would be desirable to be able to record the blocks that have changed since the last full backup, even if the system has rebooted.

BRIEF SUMMARY OF THE INVENTION

A change request associated with a disk block is tracked. The change request is allowed to pass to a disk driver. Information associated with the change request is stored in an operating system's persistent storage upon receiving an indication that the operating system is shutting down.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
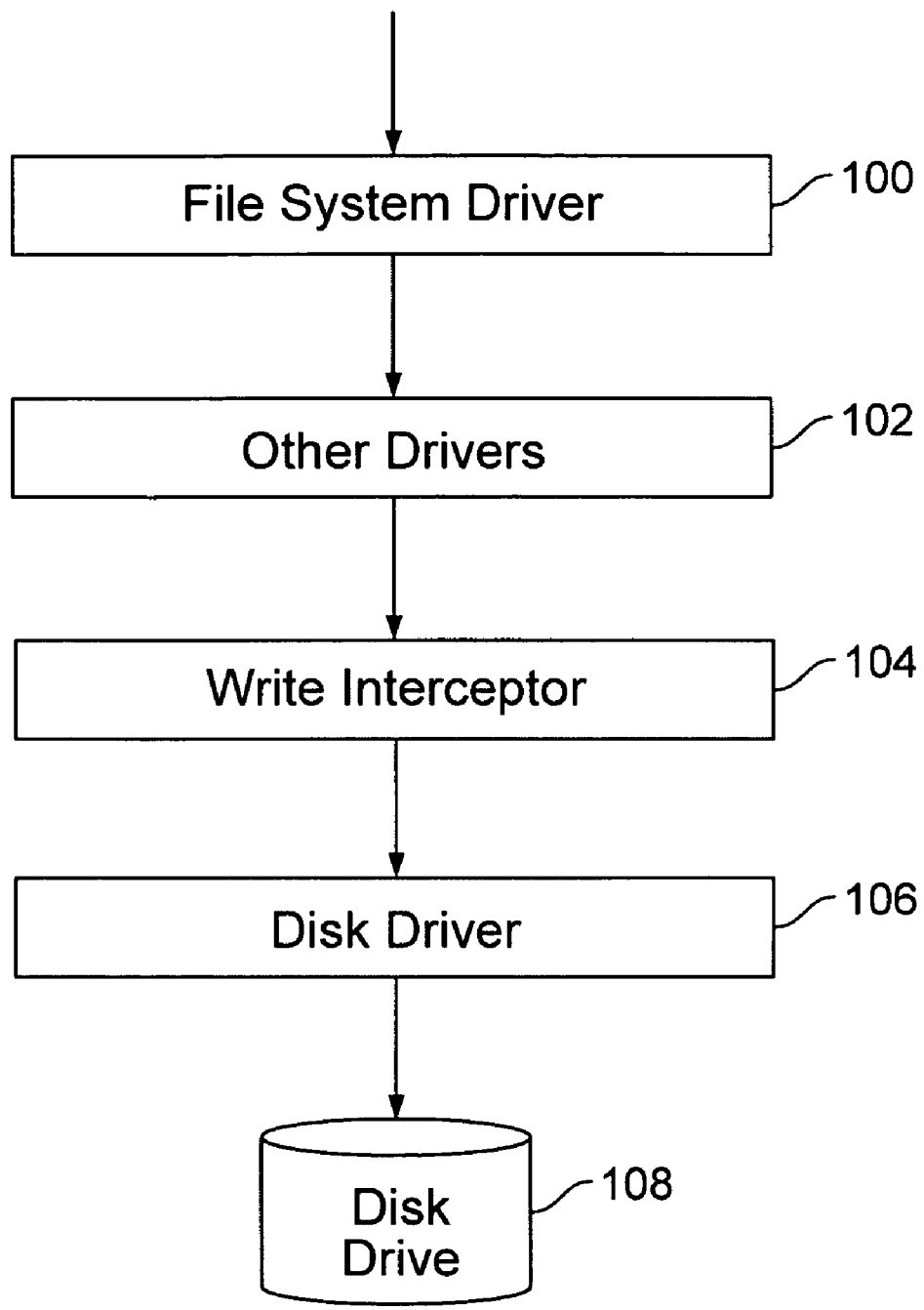
FIG. 1 is a block diagram illustrating an embodiment of a layered device I/O architecture that includes a write interceptor.

FIG. 1 is a block diagram illustrating an embodiment of a layered device I/O architecture that includes a write interceptor. In his example, the layered device 110 architecture includes multiple layers of drivers 100, 102, and 106 that drive the disk drive 108. I/O requests are received by the file system driver 100 and passed through other drivers 102. The I/O requests are then processed through the write interceptor 104, then through the disk driver 106 and to the disk drive 108. Further details of the processing by the write interceptor 104 are discussed in conjunction with the remaining figures.

Figure 2:
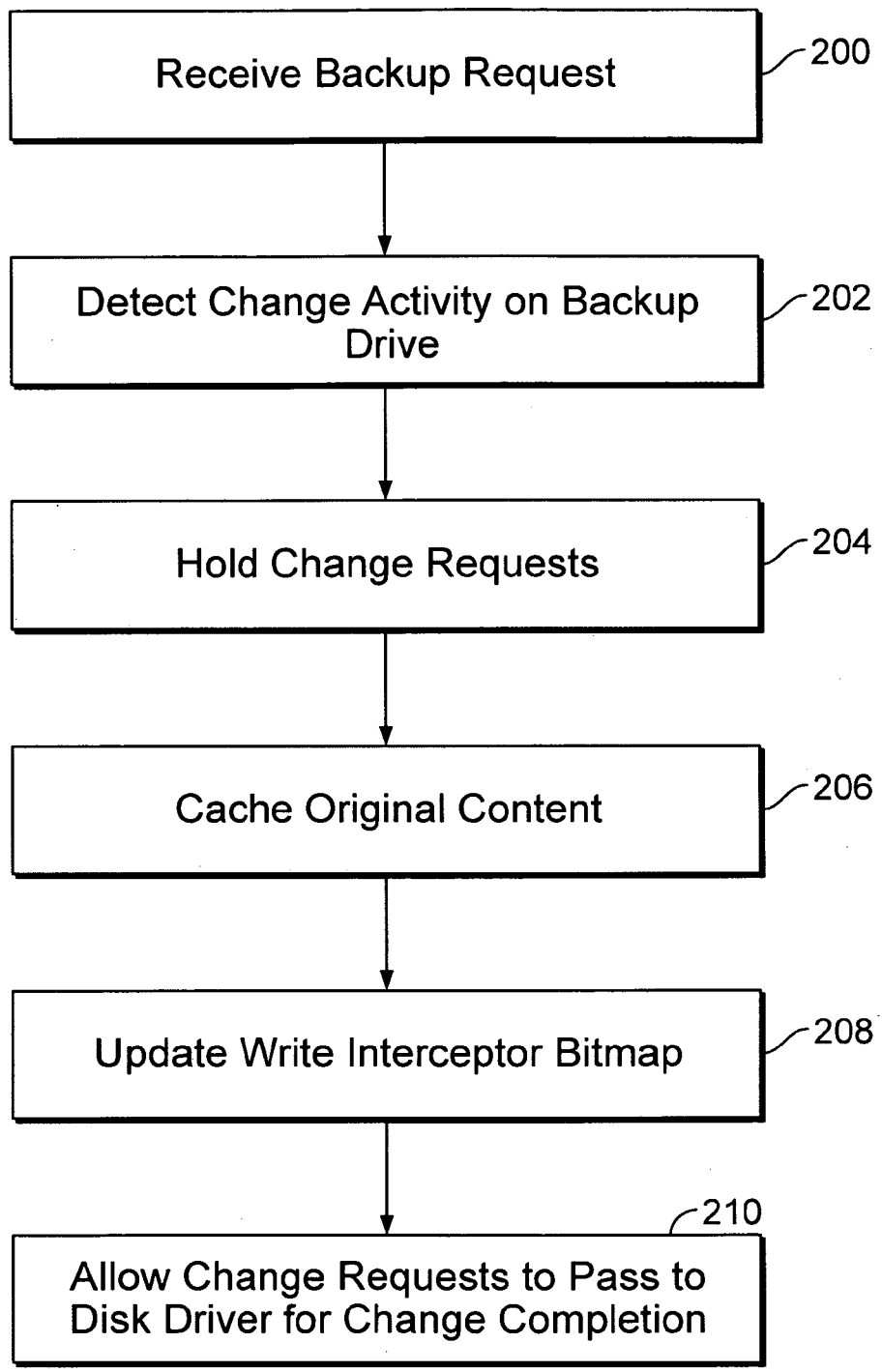
FIG. 2 is a flow diagram of a method according to some embodiments for recording changes to the disk during backup.

FIG. 2 is a flow diagram of a method according to some embodiments for recording changes to the disk during backup. In this example, a backup request is received (200). Any change activity, such as a write request on the backup drive is detected (202). The change requests are held (204). For example, write requests are placed in a queue and not allowed to execute. A change request, as used herein, includes any request that can alter the disk image of the file system. Examples of change requests, include a write request, requests to create a new file, open a new file for writing, rename, move, or delete a file, and change directory permission associated with a file.

The original content is cached (206). The write interceptor bitmap is then updated (208). The write interceptor bitmap tracks disk activity by storing a single bit to represent a block of the disk, such as 64K. For example, if a bit in the write interceptor's bitmap represents the third 64K block in the disk, and it is set to one, then this implies that the third block of 64K in the disk has been changed since the last full backup. In some embodiments, if a single block is changed multiple times, then the first change alters the bit in the bitmap corresponding to that block. The remaining changes to this same block do not affect the corresponding block in the bitmap in some embodiments.

The change requests, such as write requests, are then allowed to pass to the disk driver for change completion (210).

According to some embodiments, the write interceptor notes the blocks being changed in the disk and updates its bitmap, and the change requests are then executed. In some embodiments, once a full backup request is received, all change requests are updated to the write interceptor bitmap. Accordingly, if a differential backup is requested, the blocks that have been changed since the last full backup can be identified and backed up.

Figure 3:
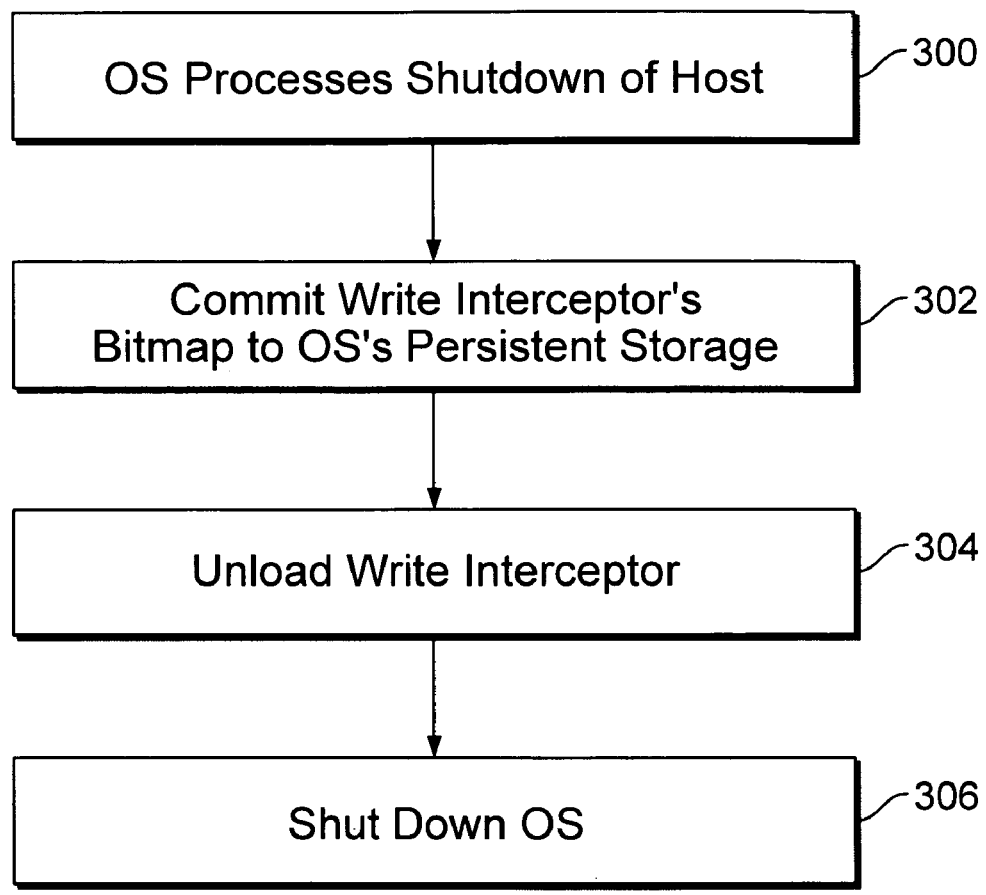
FIG. 3 is a flow diagram of a method according to some embodiments for committing the write interceptor's bitmap to the operating system's persistent storage.

FIG. 3 is a flow diagram of a method according to some embodiments for committing the write interceptor's bitmap to the operating system's persistent storage during shutdown. The operating system's persistent storage, as used herein, includes any persistent storage used by the operating system, such as Microsoft Windows Registry or AIX's ODM. In this example, the operating system processes the shut down of the host computer (300). The write interceptor's bitmap is then committed to the operating system's persistent storage, such as the Window Registry (302). The write interceptor is then unloaded (304), and the operating system is shut down (306). In some embodiments, the write interceptor's bitmap is committed to the operating system's persistent storage after the other applications have shut down. Accordingly, it can be insured that all change requests have been noted by the write interceptor.

Figure 4:
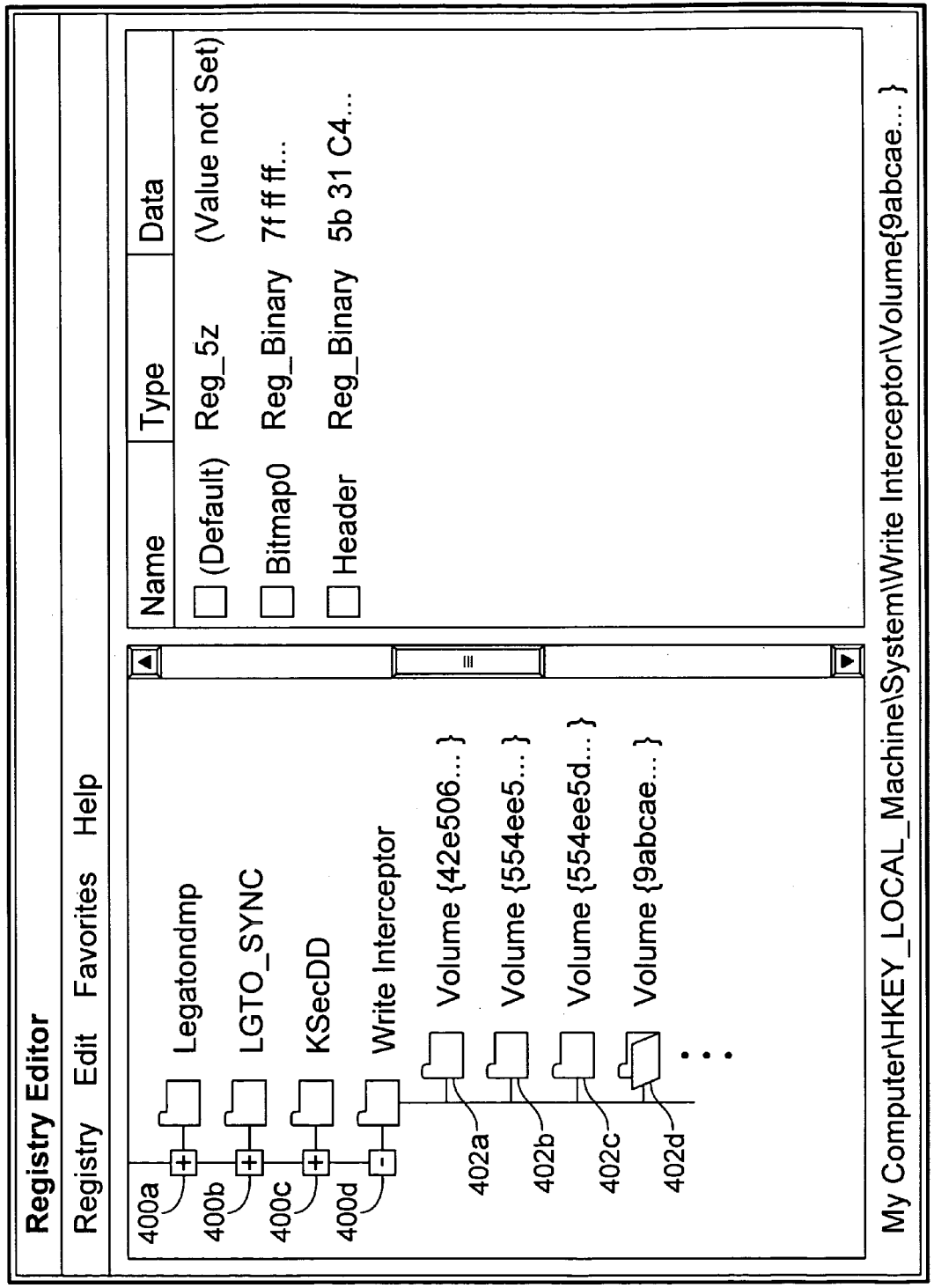
FIG. 4 is a visual example of a Microsoft Windows Registry including a write interceptor according to some embodiments.

FIG. 4 is a visual example of a Microsoft Windows Registry including a write interceptor according to some embodiments. In this example, the registry is shown to include applications 400A-400D. The write interceptor 400D is shown to include files 402A-402D associated with blocks of the disk. When a block changes, a corresponding file 402A-402D reflects that the block has changed since the last full backup.

Figure 5:
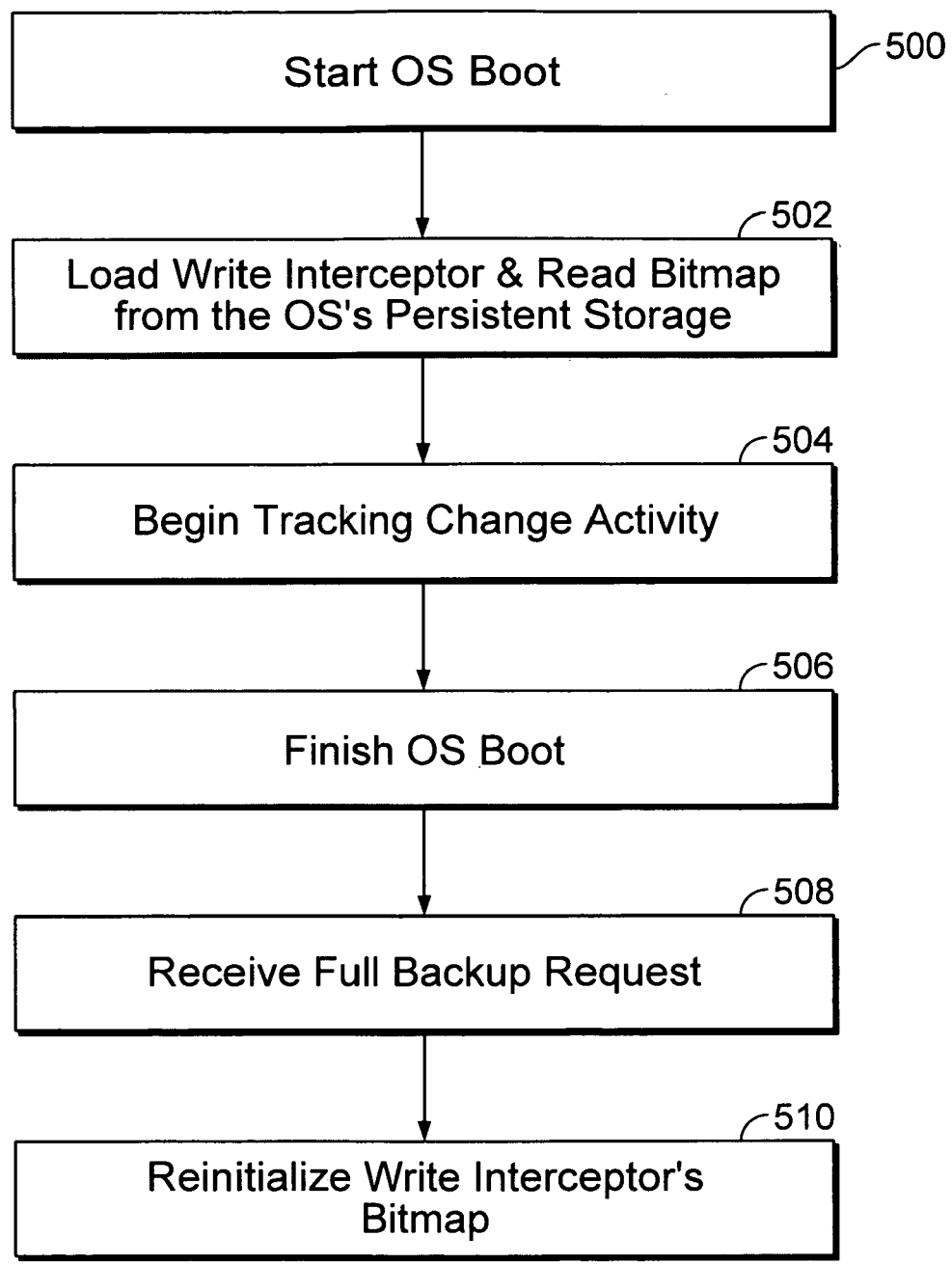
FIG. 5 is a flow diagram of a method according to some embodiments for tracking changes to a disk even after a computer shuts down and boots up.

FIG. 5 is a flow diagram of a method according to some embodiments for tracking changes to a disk even after a computer shuts down and boots up. In this example, the operating system of the host machine begins booting up (500). The write interceptor is loaded and the bitmap is read from the operating system's persistent storage (502). In some embodiments, the write interceptor is one of the first things to be loaded so that if any application requests a change to the data blocks, the write interceptor will already be loaded and tracking these changes. Once loaded, the write interceptor begins tracking change activity (504). The operating system finishes booting (506). At some later time, a full backup request is received (508). When a full backup request is received, the write interceptor's bitmap is reinitialized (510) since all changes up to the time of the backup will be incorporated into the backup. Accordingly, the write interceptor can again begin tracking changes to the disk.

Figure 6:
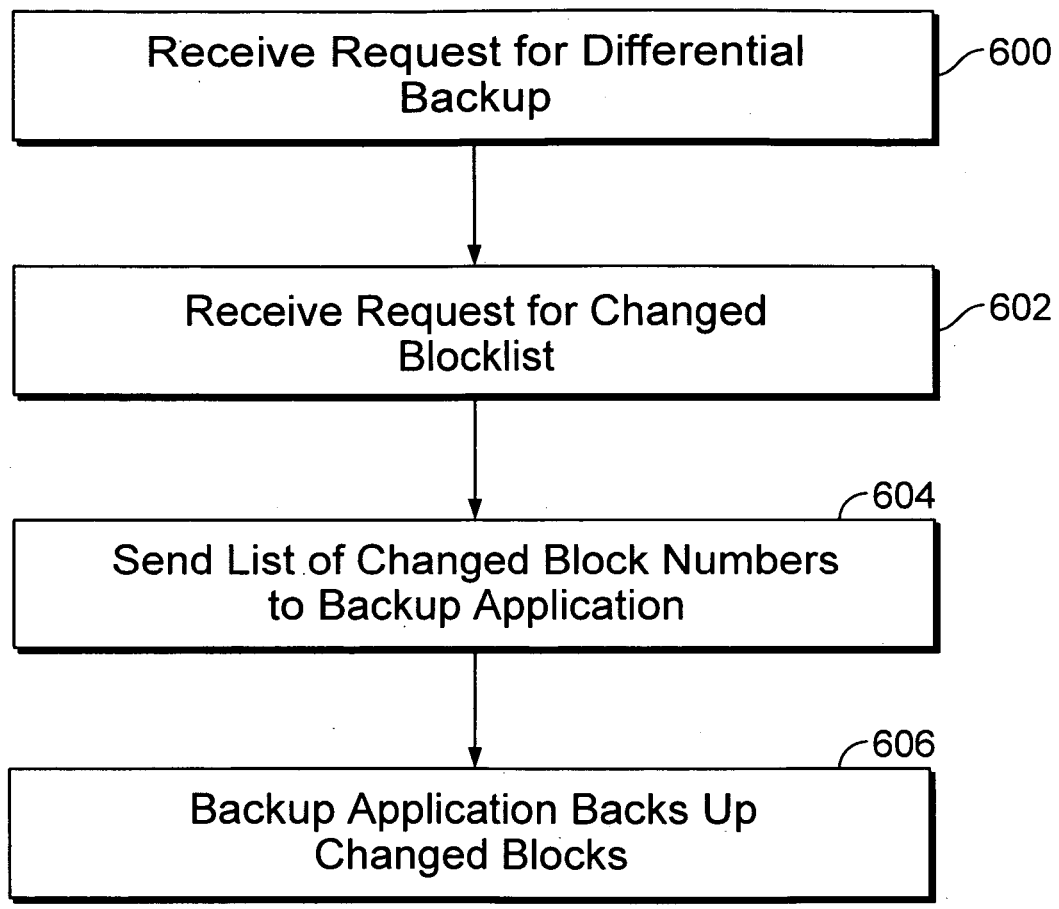
FIG. 6 is a flow diagram of a method according to some embodiments for using a write interceptor.

FIG. 6 is a flow diagram of a method according to some embodiments for using a write interceptor for a differential backup. In this example, the request for a differential backup is received (600). A request for the changed block list is also received (602). A list of changed blocks are then sent to the backup application (604). The backup application then backs up the changed blocks (606).

Figure 7:
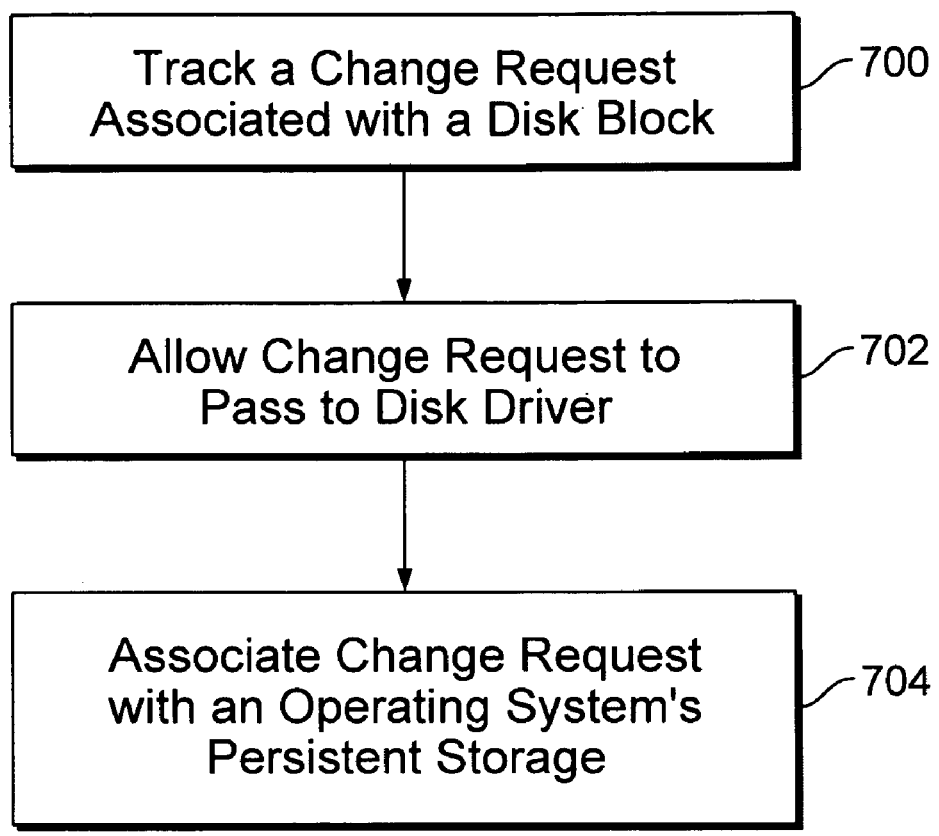
FIG. 7 is a flow diagram of a method for tracking changes to a disk image according to some embodiments.

FIG. 7 is a flow diagram of a method for tracking changes to a disk image according to some embodiments. In this example, a change request is tracked, wherein the change request is associated with a disk block (700). The change request is allowed to pass to the disk driver (702). The change request is associated with an operating system's persistent storage (704).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for tracking changes to a disk image comprising:
   tracking a change request which when performed by a disk driver changes a disk block;
   allowing the change request to pass to the disk driver to be performed on the disk block;
   using a processor to store in an operating system's persistent storage information that indicates the disk block has been changed upon receiving an indication that the operating system is shutting down;
   receiving a request to perform a full backup; and
   in response to the request to perform a full backup:
      performing a full backup; and
      using the processor to erase the information stored in the operating system's persistent storage that indicates the disk block has been changed.

2. The method of claim 1, wherein the operating system's persistent storage is a registry and/or Object Data Manager (ODM).

3. The method of claim 1, further comprising tracking a second change request associated with a second disk block.

4. The method of claim 1, wherein the change request includes at least one of the following: a write request, a request to create a new file, a request to open a new file for writing, a request associated with renaming, a request associated with moving, a request associated with deleting a file, or a request associated with changing a permission associated with a file.

5. The method of claim 1 further comprising:
   receiving a request to perform a differential backup; and
   in response to the request to perform a differential backup:
      performing a differential backup, including by:
         accessing the information stored in the operating system's persistent storage that indicates the disk block has been changed;
         generating a changed block list based at least in part on the accessed information; and
         providing the changed block list to a backup process; and
      maintaining the information stored in the operating system's persistent storage.

6. The method of claim 1, wherein tracking is performed by a write interceptor and the method further includes during a boot sequence, loading the write interceptor prior to loading any application capable of issuing a change request.

7. The method of claim 1, wherein the information is stored after all applications capable of issuing a change request have been shut down.

8. The method of claim 1, wherein there is a plurality of disk blocks and using a processor to store information includes changing, in a bitmap, a value of a bit that corresponds to the disk block.

9. The method of claim 1, wherein during a backup, before the change request is allowed to pass to the disk driver, the method further includes:
   storing the change request; and
   storing pre-change content associated with the disk block, wherein the change request is allowed to pass to the disk driver after the pre-change content is stored.

10. A system for tracking changes to a disk image comprising:
    a processor configured to:
       track a change request which when performed by a disk driver changes a disk block;
       allow the change request to pass to the disk driver to be performed on the disk block;
       store in an operating system's persistent storage information that indicates the disk block has been changed upon receiving an indication that the operating system is shutting down;
       receive a request to perform a full backup; and
       in response to the request to perform a full backup:
          perform a full backup; and
          erase the information stored in the operating system's persistent storage that indicates the disk block has been changed; and
    a memory coupled with the processor, wherein the memory provides the processor with instructions.

11. The system of claim 10, wherein the processor is further configured to:

receive a request to perform a differential backup; and
in response to the request to perform a differential backup:
   perform a differential backup, including by:
      accessing the information stored in the operating system's persistent storage that indicates the disk block has been changed;
      generating a changed block list based at least in part on the accessed information; and
      providing the changed block list to a backup process; and
   maintain the information stored in the operating system's persistent storage.

12. The system of claim 10, wherein tracking is performed by a write interceptor and the processor is further configured to during a boot sequence, load the write interceptor prior to loading any application capable of issuing a change request.

13. The system of claim 10, wherein the information is stored after all applications capable of issuing a change request have been shut down.

14. The system of claim 10, wherein there is a plurality of disk blocks and the processor is configured to store information by changing, in a bitmap, a value of a bit that corresponds to the disk block.

15. The system of claim 10, wherein during a backup, before the change request is allowed to pass to the disk driver, the processor is further configured to:
   store the change request; and
   store pre-change content associated with the disk block, wherein the change request is allowed to pass to the disk driver after the pre-change content is stored.

16. A computer program product for tracking changes to a disk image, the computer program product being embodied in a computer readable storage medium and comprising computer instructions for:
   tracking a change request which when performed by a disk driver changes a disk block;
   allowing the change request to pass to the disk driver to be performed on the disk block; and
   storing in an operating system's persistent storage information that indicates the disk block has been changed upon receiving an indication that the operating system is shutting down;
   receiving a request to perform a full backup; and
   in response to the request to perform a full backup:
      performing a full backup; and
      erasing the information stored in the operating system's persistent storage that indicates the disk block has been changed.

17. The computer program product of claim 16 further comprising computer instructions for:
   receiving a request to perform a differential backup; and
   in response to the request to perform a differential backup:
      performing a differential backup, including by:
         accessing the information stored in the operating system's persistent storage that indicates the disk block has been changed;
         generating a changed block list based at least in part on the accessed information; and
         providing the changed block list to a backup process; and
      maintaining the information stored in the operating system's persistent storage.

18. The computer program product of claim 16, wherein tracking is performed by a write interceptor and the computer program product further includes computer instructions for during a boot sequence, loading the write interceptor prior to loading any application capable of issuing a change request.

19. The computer program product of claim 16, wherein the information is stored after all applications capable of issuing a change request have been shut down.

20. The computer program product of claim 16, wherein there is a plurality of disk blocks and the computer instructions for storing information include computer instructions for changing, in a bitmap, a value of a bit that corresponds to the disk block.

21. The computer program product of claim 16, wherein during a backup, before the change request is allowed to pass to the disk driver, the computer program product further includes computer instructions for:
   storing the change request; and
   storing pre-change content associated with the disk block, wherein the change request is allowed to pass to the disk driver after the pre-change content is stored.

\* \* \* \* \*